US011939895B2

(12) United States Patent
Bick et al.

(10) Patent No.: US 11,939,895 B2
(45) Date of Patent: Mar. 26, 2024

(54) INTERNAL COMBUSTION ENGINE WITH A CRANKCASE VENTILATION MEANS

(71) Applicant: FEV Group GmbH, Aachen (DE)

(72) Inventors: Werner Bick, Würselen (DE); Ralf Bey, Aachen (DE); Markus Ehrly, Aachen (DE); Ralf Jans, Niederkrüchten (DE); Christoph Biwer, Aachen (DE)

(73) Assignee: FEV Group GmbH (DE)

( * ) Notice: Subject to any disclaimer, the term of this patent is extended or adjusted under 35 U.S.C. 154(b) by 0 days.

(21) Appl. No.: 18/084,841

(22) Filed: Dec. 20, 2022

(65) Prior Publication Data

US 2023/0203971 A1    Jun. 29, 2023

(30) Foreign Application Priority Data

Dec. 20, 2021   (DE) .......................... 102021133918.9

(51) Int. Cl.
*F01M 13/00* (2006.01)
*F01M 13/02* (2006.01)
*F01M 13/04* (2006.01)

(52) U.S. Cl.
CPC .......... *F01M 13/021* (2013.01); *F01M 13/04* (2013.01); *F01M 2013/026* (2013.01); *F01M 2013/0477* (2013.01); *F01M 2013/0483* (2013.01)

(58) Field of Classification Search
CPC ........... F01M 2013/0038; F01M 13/00; F01M 2013/005; F01M 2013/0055; F01M 3/00; F01M 3/02
See application file for complete search history.

(56) References Cited

U.S. PATENT DOCUMENTS 3,616,779 A     11/1971  Newkirk
5,937,837 A  *   8/1999  Shaffer ................. F01M 5/002
                                              123/573

FOREIGN PATENT DOCUMENTS

DE      10310452 A1  *  9/2004    ............. F01M 13/04
DE      10313192 A1  * 10/2004    ............. F01M 13/022
JP      2009228600 A  * 10/2009
JP      2009275632 A  * 11/2009

OTHER PUBLICATIONS

DE 10310452 A1—English translation (Year: 2004).*

* cited by examiner

Primary Examiner — George C Jin
Assistant Examiner — Teuta B Holbrook
(74) *Attorney, Agent, or Firm* — Burris Law, PLLC (57) ABSTRACT

The invention relates to an internal combustion engine, comprising an intake path, a crankcase, an exhaust gas path and a crankcase ventilation means, wherein the crankcase ventilation means is open, closed or separate. The internal combustion engine according to the invention comprises an intake path, a crankcase, an exhaust gas path and an open crankcase ventilation means, wherein the open crankcase ventilation means comprises a first line and a second line, wherein the first line is designed to connect the exhaust gas path to the crankcase in order to guide exhaust gas out of the exhaust gas path to the crankcase, and wherein the second line is designed to connect the crankcase to the exhaust gas path in order to discharge exhaust gas and leakage gases located in the crankcase from the crankcase and to feed them to the exhaust gas path.

11 Claims, 7 Drawing Sheets

INTERNAL COMBUSTION ENGINE WITH A CRANKCASE VENTILATION MEANS

CROSS-REFERENCE TO RELATED APPLICATIONS

This application claims priority to and the benefit of German Patent Application No.: 102021133918.9 filed on Dec. 20, 2021. The disclosure of the above application is incorporated herein by reference.

FIELD

The present disclosure relates to an internal combustion engine, comprising an intake path, a crankcase, an exhaust gas path and a crankcase ventilation means, wherein the crankcase ventilation means is open, closed or separate.

BACKGROUND

The statements in this section merely provide background information related to the present disclosure and may not constitute prior art.

U.S. Pat. No. 3,616,779 A discloses an internal combustion engine with a crankcase ventilation means, wherein provision is made for cold, gaseous fuel to be conducted through the crankcase.

SUMMARY

This section provides a general summary of the disclosure and is not a comprehensive disclosure of its full scope or all of its features.

The internal combustion engine according to the invention comprises an intake path, a crankcase, an exhaust gas path and an open crankcase ventilation means, wherein the open crankcase ventilation means comprises a first line and a second line, wherein the first line is designed to connect the exhaust gas path to the crankcase in order to guide exhaust gas out of the exhaust gas path to the crankcase, and wherein the second line is designed to connect the crankcase to the exhaust gas path in order to discharge exhaust gas and leakage gases located in the crankcase from the crankcase and to feed them to the exhaust gas path.

Since the first line is designed to guide exhaust gas out of the exhaust gas path to the crankcase and the second line is designed to discharge exhaust gas and leakage gases located in the crankcase from the crankcase and to feed them to the exhaust gas path, the invention renders it possible for potentially combustible leakage gases to be flushed out of the crankcase or at least to be diluted with the exhaust gas, so that the combustibility of the gases located in the crankcase can be reduced.

In this case, the first line can be connected to the exhaust gas path such that the exhaust gas is discharged from the exhaust gas path upstream or downstream of an exhaust gas aftertreatment system arranged in the exhaust gas path. The second line can be connected to the exhaust gas path such that the exhaust gas and leakage gases located in the crankcase are fed to the exhaust gas path upstream or downstream of the exhaust gas aftertreatment system arranged in the exhaust gas path.

The first line preferably discharges the exhaust gas from the exhaust gas path upstream of a point at which the second line feeds the exhaust gas and leakage gases located in the crankcase to the exhaust gas path, so that the exhaust gas is discharged at a pressure that is higher than a pressure at the point in the exhaust gas path at which the discharged exhaust gas and leakage gases located in the crankcase are returned to the exhaust gas path.

The second line is particularly preferably configured to feed the discharged exhaust gas and leakage gases located in the crankcase to the exhaust gas path upstream of the exhaust gas aftertreatment system, in particular upstream of an oxidation catalyst, so that pollutants contained in the returned gases can be removed or at least reduced.

Here, the internal combustion engine can be configured as a direct-injection internal combustion engine, but also as an internal combustion engine with manifold injection, single-point injection or multiple-point injection. The internal combustion engine is preferably configured for operation using a gaseous fuel, particularly preferably using hydrogen.

Here, discharge of exhaust gas from the exhaust gas path is understood to mean that the first line is designed to discharge a partial flow of a total exhaust gas flow from the exhaust gas path and to feed it to the crankcase. The partial flow is preferably less than 50% of the total exhaust gas flow, particularly preferably less than 25% of the total exhaust gas flow.

The internal combustion engine according to the invention comprises an intake path, a crankcase, an exhaust gas path and a closed crankcase ventilation means, wherein the closed crankcase ventilation means comprises a first line and a second line, wherein the first line is designed to connect the intake path or the exhaust gas path to the crankcase in order to guide fresh gas out of the intake path or exhaust gas out of the exhaust gas path to the crankcase, and wherein the second line is designed to connect the crankcase to the intake path in order to discharge fresh gas or exhaust gas and leakage gases located in the crankcase from the crankcase and to feed them to the intake path.

Since the first line is designed to guide fresh gas out of the intake path or exhaust gas out of the exhaust gas path to the crankcase, and the second line is designed to discharge fresh gas or exhaust gas and leakage gases located in the crankcase from the crankcase and to feed them to the intake path, the invention renders it possible for potentially combustible leakage gases to be flushed out of the crankcase or at least to be diluted with the fresh gas or exhaust gas, so that the combustibility of the gases located in the crankcase can be reduced.

Since the fresh gas or exhaust gas and leakage gases located in the crankcase are fed to the intake path and therefore to the combustion process, the invention furthermore renders it possible for pollutants discharged from the crankcase to be burnt or removed or at least reduced in an exhaust gas aftertreatment system arranged in the exhaust gas path.

If the first line is designed to feed exhaust gas to the crankcase, said first line can be connected to the exhaust gas path such that the exhaust gas is discharged from the exhaust gas path upstream or downstream of an exhaust gas aftertreatment system arranged in the exhaust gas path. If the first line is designed to feed fresh air to the crankcase, said first line is therefore preferably connected to the intake path such that it discharges a partial flow of a total fresh air flow from the intake path upstream of a compressor and supplies it to the crankcase.

The second line is preferably connected to the intake path such that the discharged fresh gas or the discharged exhaust gas and leakage gases located in the crankcase are fed to the intake path upstream of a compressor.

As an alternative, the second line is designed to feed only a partial flow of the discharged fresh gas or the discharged exhaust gas and the leakage gases located in the crankcase to the intake path. The second line is then furthermore designed to feed a second partial flow to the exhaust gas path. Therefore, the invention renders it possible for a volume flow in the intake path to be able to be limited, but nevertheless at the same time for at least a partial flow of the discharged fresh gas or the discharged exhaust gas and the leakage gases located in the crankcase to be able to be fed to the intake path and therefore to the combustion process. The second line is preferably designed to adjust a partial flow quantity, so that the partial flow can be adjusted, for example, depending on an operating state of the internal combustion engine.

The internal combustion engine according to the invention comprises an intake path, a crankcase, an exhaust gas path and a closed crankcase ventilation means, wherein the closed crankcase ventilation means comprises a compressor and also a first line and a second line, wherein the first line is designed to connect the compressor to the crankcase in order to guide fresh gas from the compressor to the crankcase, and wherein the second line is designed to connect the crankcase to the intake path in order to discharge fresh gas and leakage gases located in the crankcase from the crankcase and to feed them to the intake path.

Since the first line is designed to guide fresh gas from the compressor to the crankcase and the second line is designed to discharge fresh gas and leakage gases located in the crankcase from the crankcase and feed them to the intake path, the invention renders it possible for potentially combustible leakage gases to be flushed out of the crankcase or at least to be diluted with the fresh gas, so that the combustibility of the gases located in the crankcase can be reduced.

The second line is preferably connected to the intake path such that the discharged fresh gas or the discharged exhaust gas and leakage gases located in the crankcase are fed to the intake path upstream of a compressor.

The internal combustion engine according to the invention comprises an intake path, a crankcase, an exhaust gas path and a separate crankcase ventilation means, wherein the separate crankcase ventilation means comprises a device for removing fuel and also a first line and a second line and the first line and the second line are designed to conduct a substantially inert gas, wherein the first line is designed to connect the device for removing fuel to the crankcase in order to guide the substantially inert gas from the device for removing fuel to the crankcase, and wherein the second line is designed to connect the crankcase to the device for removing fuel in order to discharge the substantially inert gas and leakage gases located in the crankcase from the crankcase and to feed them to the device for removing fuel.

Since the first line is designed to guide the substantially inert gas from the device for removing fuel to the crankcase and the second line is designed to discharge the substantially inert gas and leakage gases located in the crankcase from the crankcase and to supply them to the device for removing fuel, the invention renders it possible for potentially combustible leakage gases to be flushed out of the crankcase or at least to be diluted with the substantially inert gas, so that the combustibility of the gases located in the crankcase can be reduced.

Here, substantially inert gas is understood to mean that the first line and the second line are filled with an inert gas, it being possible for the inert gas to be mixed with other fluids due to leaks, leakage gases and other disturbance effects, so that the first line and the second line are filled only with a substantially inert gas. Here, substantially inert means that the inert gas is at least 90% by volume of the total volume of the first line and the second line, preferably at least 95%, particularly preferably at least 98%.

The inert gas is preferably nitrogen.

Here, device for removing fuel is understood to mean a device which is designed to remove fuel and/or other unburnt hydrocarbons, which are constituents of the leakage gases discharged from the crankcase, from the substantially inert gas.

The device for removing fuel is preferably configured as a fuel separator or catalytic converter.

Since the device for removing fuel is configured as a fuel separator or catalytic converter, the invention renders it possible for fuel and/or other unburnt hydrocarbons to be filtered out of the substantially inert gas using, for example, a membrane or to be converted into thermal energy by combustion. The thermal energy released during the combustion can be used, for example, to initiate the combustion.

In this case, the catalytic converter is preferably electrical, so that preheating and/or heating up of the catalyst is rendered possible.

The first line preferably comprises a water separator and/or an oxygen separator.

Since the first line comprises a water separator and/or an oxygen separator, the invention renders it possible for a water content and/or an oxygen content in a fluid guided by the first line to be reduced. A reduced water content can reduce wear of components, for example as a result of corrosion. A reduced oxygen content inhibits the combustibility of a gas, so that the combustibility of the gases located in the crankcase can be further reduced.

The second line preferably comprises an oil separator.

Since the second line comprises an oil separator, the invention renders it possible for wear of components of the internal combustion engine to be able to be reduced since soiling due to oil deposits can be avoided or at least reduced.

The dependent claims describe further advantageous embodiments of the invention.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
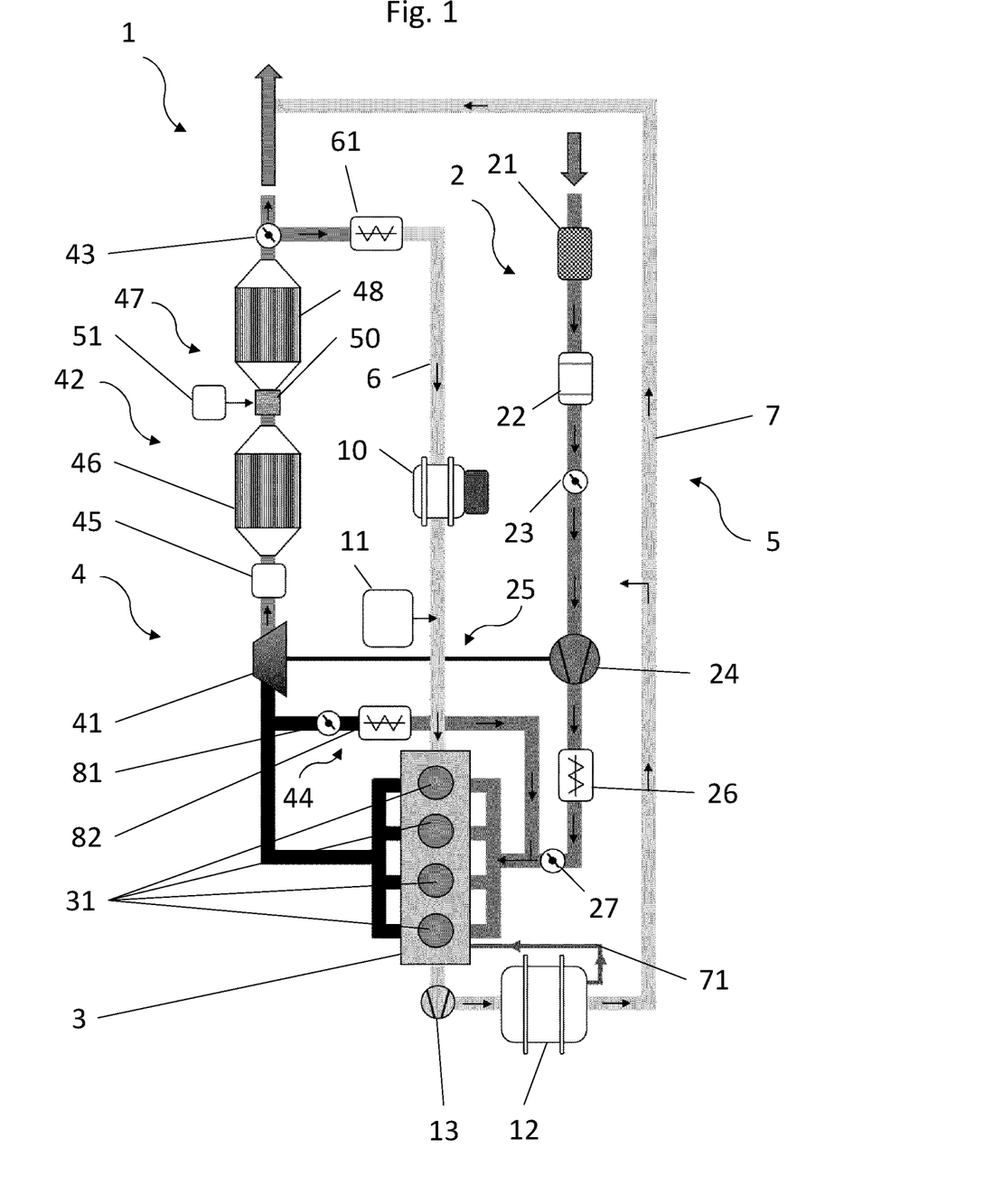
FIG. 1 shows an exemplary embodiment of an internal combustion engine with an open crankcase ventilation means.

FIG. 1 shows an internal combustion engine 1, comprising an intake path 2, a crankcase 3, an exhaust gas path 4 and an open crankcase ventilation means 5. The internal combustion engine 1 is configured to be operated using a gaseous fuel, here hydrogen.

The intake path 2 comprises an air filter 21, an airflow meter 22, a throttle valve 23, a compressor 24 of an exhaust gas turbocharger 25, a heat transfer medium 26 and a valve 27. The intake path 2 feeds a total fresh air flow to four combustion chambers 31 in which hydrogen is burnt with the fed fresh air. The internal combustion engine 1 is configured as a direct-injection engine, and therefore the hydrogen is introduced into the combustion chambers 31 directly via an injection device, not shown.

The exhaust gas path 4 comprises a turbine 41 of the exhaust gas turbocharger 25, an exhaust gas aftertreatment system 42 and an exhaust gas valve 43. A high-pressure exhaust gas return (HP-AGR) 44 is arranged upstream of the turbine 41 in order to be able to once again feed an exhaust gas partial flow to the combustion process.

The exhaust gas aftertreatment system 42 comprises a diesel particle filter 45, a diesel oxidation catalyst (DOC) 46 and an SCR system 47. The SCR system 47 consists of an SCR catalytic converter 48 and an injector 49 arranged upstream of the SCR catalytic converter in order to introduce a reducing agent into the exhaust gas path 4, and also a mixer 50 arranged between the injector 49 and the SCR catalyst 48 in order to admix the reducing agent and the exhaust gas.

The HP-AGR 44 comprises a high-pressure valve 81 and a high-pressure cooler 82.

The open crankcase ventilation means 5 comprises a first line 6 and a second line 7. The first line 6 is designed to connect the exhaust gas path 4 to the crankcase 3 in order to guide exhaust gas out of the exhaust gas path 4 to the crankcase 3. To this end, the first line 6 is connected to the exhaust gas path downstream of the exhaust gas aftertreatment system 42 such that a partial flow of the exhaust gas is guided to the crankcase 3 via the first line via the exhaust gas valve 43.

The first line 6 comprises a low-pressure cooler 61 for controlling the temperature of the discharged exhaust gas, a water separator 10 for separating off water from the discharged exhaust gas and an oxygen separator 11 in order to reduce an oxygen content in the discharged exhaust gas.

The second line 7 is designed to connect the crankcase 3 to the exhaust gas path 4 in order to discharge exhaust gas and leakage gases located in the crankcase 3 from the crankcase 3 and to feed them to the exhaust gas path 4. As a result, the formation of a combustible mixture in the crankcase 3 can be avoided or the probability of formation of a combustible mixture in the crankcase 3 can at least be reduced.

In order to discharge the exhaust gas and leakage gases located in the crankcase 3 from the crankcase, the second line 7 comprises a pump 13, so that a vacuum is preferably applied in the crankcase 3. Furthermore, the second line 7 comprises an oil separator 12 in order to separate oil discharged from the crankcase 3 from the discharged exhaust gas flow and leakage flow and to feed the separated-off oil to the crankcase 3 again via a return 71.

The second line 7 is connected to the exhaust gas path 4 such that the exhaust gas discharged from the crankcase 3 and the discharged leakage gases are fed to the exhaust gas path 4 downstream of the exhaust gas valve 43.

In an alternative exemplary embodiment, not shown, the internal combustion engine 1 comprises, in addition to the HP-AGR 44, a low-pressure AGR (ND-AGR), so that exhaust gas is discharged downstream of the exhaust gas aftertreatment system 42 and is fed to the intake path 2 upstream of the compressor 24. The ND-AGR and the open crankcase ventilation means 5 can be configured at least in sections as a line system in this case.

Figure 2:
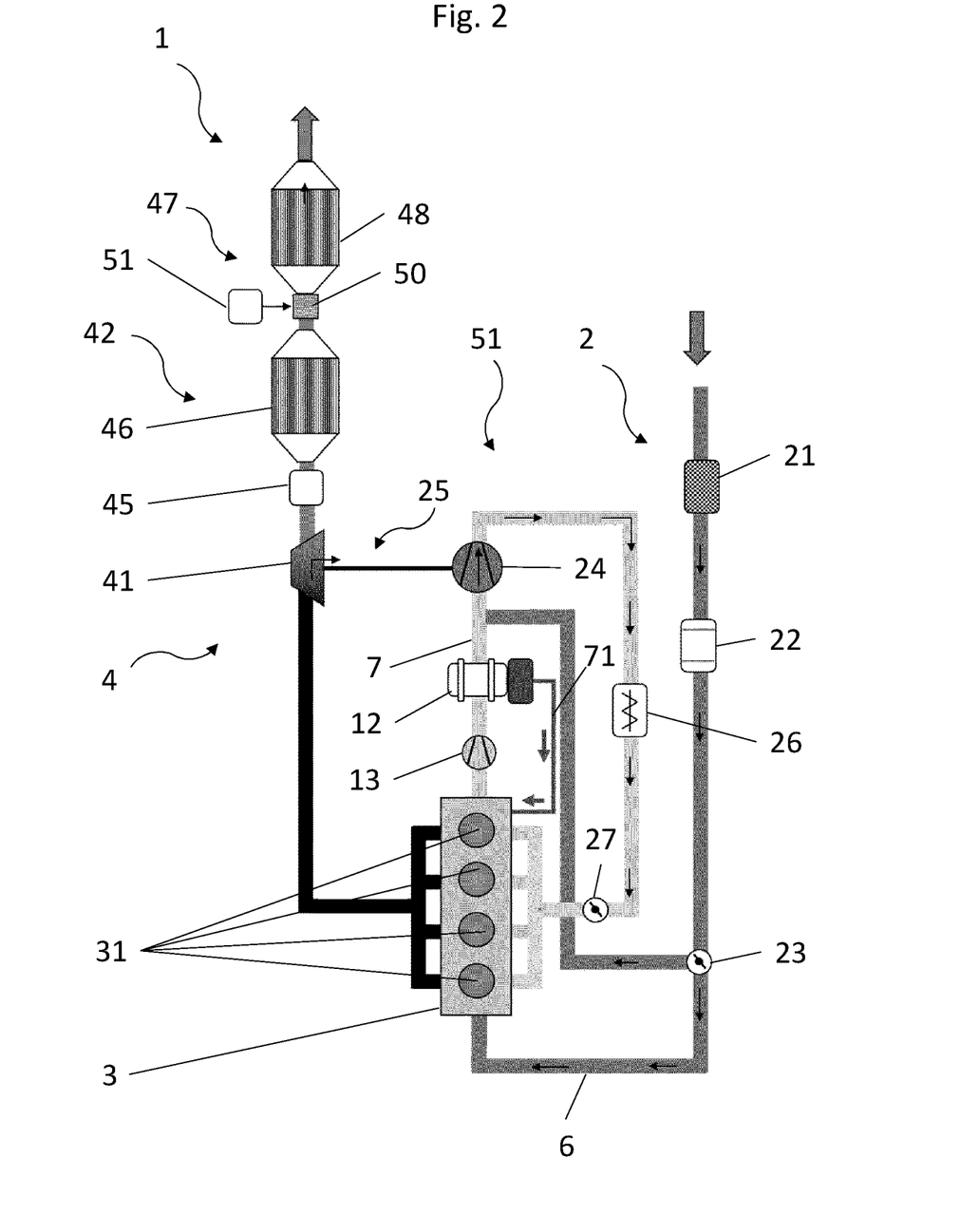
FIG. 2 shows an exemplary embodiment of an internal combustion engine with a closed crankcase ventilation means.

FIG. 2 shows an internal combustion engine 1 comprising an intake path 2, a crankcase 3, an exhaust gas path 4 and a closed crankcase ventilation means 51. The closed crankcase ventilation means 51 comprises a first line 6 and a second line 7. The first line 6 is designed to connect the intake path 2 to the crankcase 3 in order to guide a partial flow of fresh gas out of the intake path 2 to the crankcase 3. The second line 7 is designed to connect the crankcase 3 to the intake path 2 in order to discharge the discharged partial flow of fresh gas and leakage gases located in the crankcase 3 from the crankcase 3 and to feed them to the intake path 2.

In this case, the first line 6 is connected to the intake path 2 such that the partial flow of fresh gas is discharged from the intake path 2 upstream of the compressor 24. In this case, the quantity of discharged fresh gas can be adjusted via the throttle valve 23.

The second line 7 is connected to the intake path 2 such that the discharged partial flow of fresh gas and the leakage gases located in the crankcase 3 are fed to the intake path again upstream of the compressor 24 but downstream of the throttle valve 23. The discharged partial stream of fresh gas thus flushes the crankcase 3 and discharged leakage gases are also fed to the combustion chambers 31, so that contained pollutants can be burnt or can be rendered at least partially harmless in the exhaust gas aftertreatment system 42.

Figure 3:
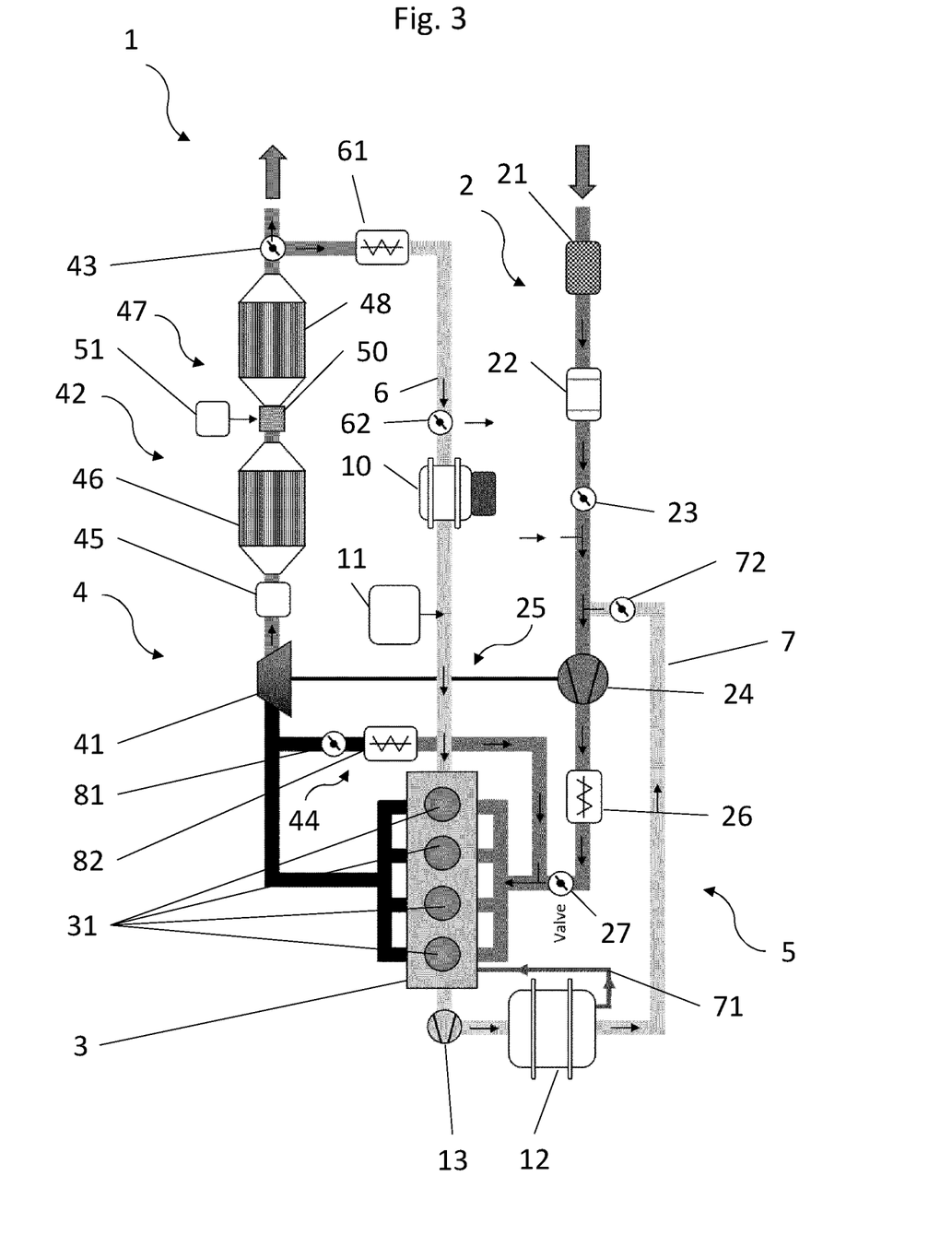
FIG. 3 shows an alternative exemplary embodiment of an internal combustion engine with a closed crankcase ventilation means.

FIG. 3 shows an internal combustion engine 1 comprising an intake path 2, a crankcase 3, an exhaust gas path 4 and a closed crankcase ventilation means 51. The closed crankcase ventilation means 51 comprises a first line 6 and a second line 7. The first line 6 is designed to connect the exhaust gas path 4 to the crankcase 3 in order to guide a partial flow of exhaust gas out of the exhaust gas path 4 to the crankcase 3. The second line 7 is designed to connect the crankcase 3 to the intake path 2 in order to discharge the discharged partial flow of exhaust gas and leakage gases located in the crankcase 3 from the crankcase 3 and to feed them to the intake path 2.

In this case, the first line 6 is connected to the exhaust gas path 2 such that the partial flow of exhaust gas is discharged from the exhaust gas path 4 downstream of the exhaust gas aftertreatment system 42. In this case, the quantity of discharged exhaust gas can be adjusted via the exhaust gas valve 43.

The first line 6 comprises a low-pressure cooler 61, an AGR valve 62, a water separator 10 and an oxygen separator 11. The AGR valve 62 is designed to discharge a further partial flow of exhaust gas from the first line and to feed it to the intake path 2 upstream of the compressor 24 in order to create an ND-AGR.

The second line 7 is connected to the intake path 2 such that the discharged partial flow of exhaust gas and the leakage gases located in the crankcase 3 are again fed to the intake path 2 upstream of the compressor 24 but downstream of the throttle valve 23. The discharged partial stream of exhaust gas thus flushes the crankcase 3 and discharged leakage gases are also fed to the combustion chambers 31, so that contained pollutants can be burnt or can be rendered at least partially harmless in the exhaust gas aftertreatment system 42. The second line comprises a first control valve 72 in order to control a mass flow fed to the intake path from the second line 7.

Figure 4:
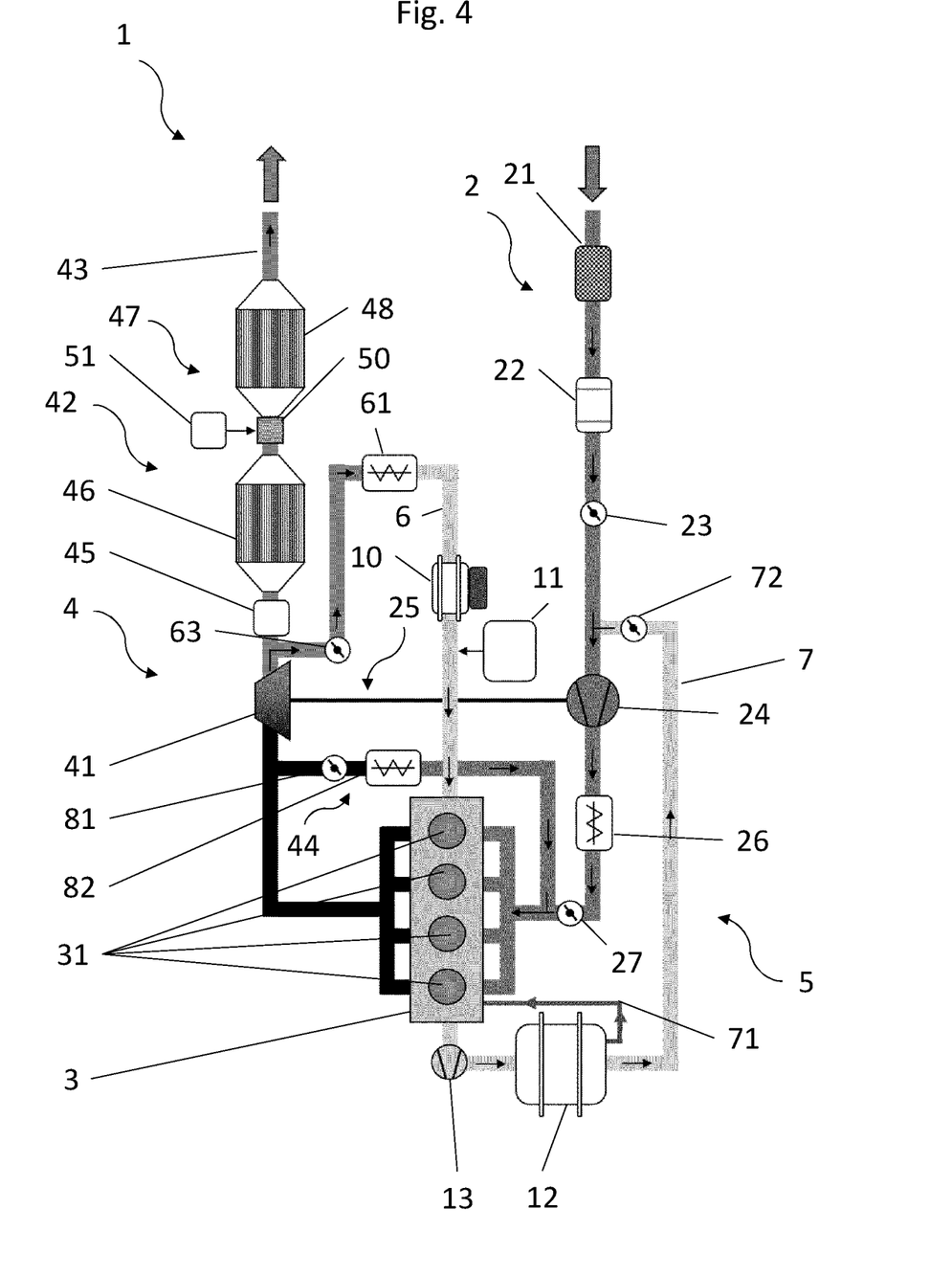
FIG. 4 shows a further, alternative exemplary embodiment of an internal combustion engine with a closed crankcase ventilation means.

FIG. 4 shows an internal combustion engine 1 comprising an intake path 2, a crankcase 3, an exhaust gas path 4 and a closed crankcase ventilation means 51. The closed crankcase ventilation means 51 comprises a first line 6 and a second line 7. The first line 6 is designed to connect the exhaust gas path 4 to the crankcase 3 in order to guide a partial flow of exhaust gas out of the exhaust gas path 4 to the crankcase 3. The second line 7 is designed to connect the crankcase 3 to the intake path 2 in order to discharge the discharged partial flow of exhaust gas and leakage gases located in the crankcase 3 from the crankcase 3 and to feed them to the intake path 2.

In contrast to the internal combustion engine 1 with a closed crankcase ventilation means 51 illustrated in FIG. 3, the first line 6 is connected to the exhaust gas path 2 such that the partial flow of exhaust gas is discharged from the exhaust gas path 4 upstream of the exhaust gas aftertreatment system 42. In this case, the quantity of discharged exhaust gas can be adjusted via a second control valve 63.

Figure 5:
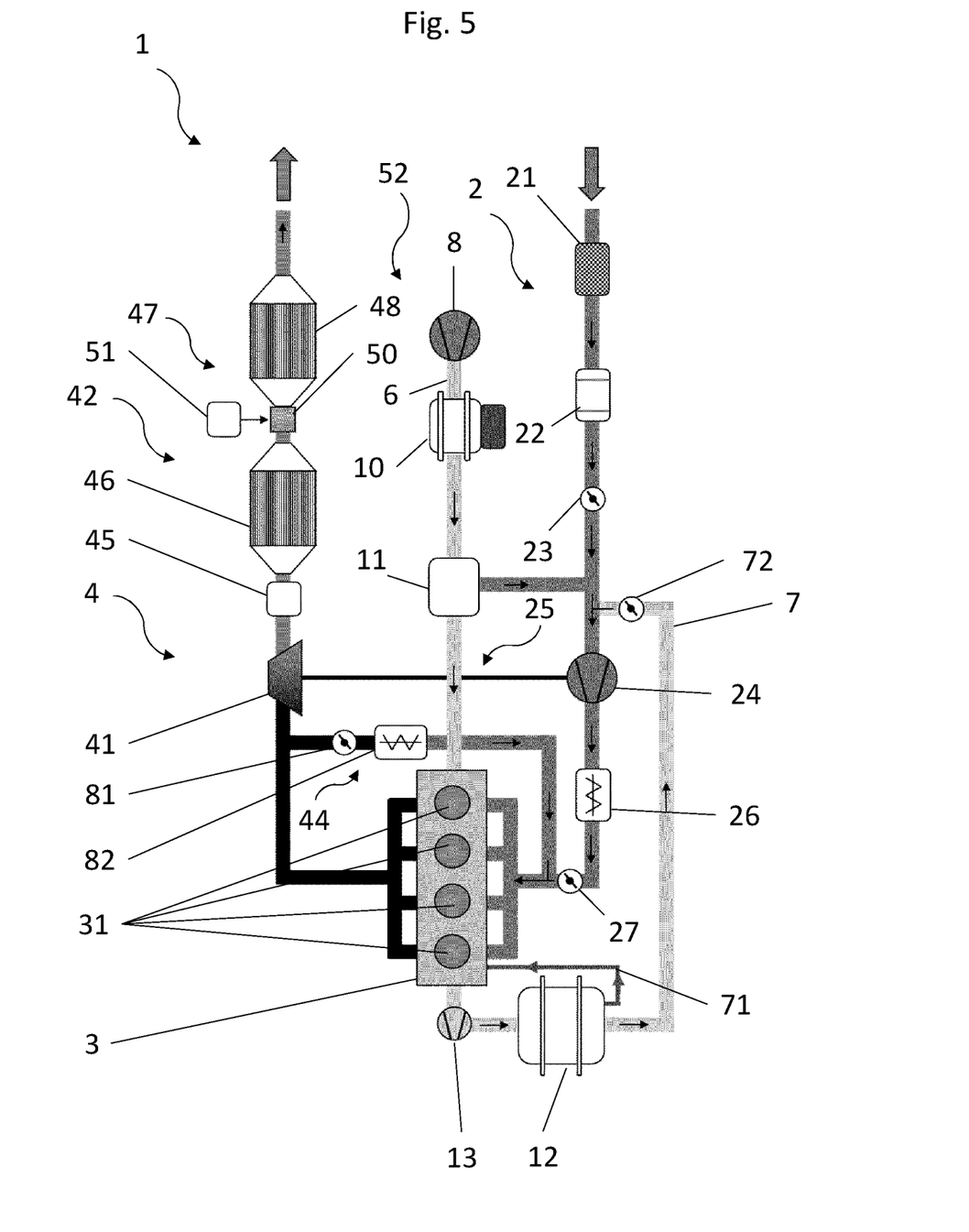
FIG. 5 shows a further, alternative exemplary embodiment of an internal combustion engine with a closed crankcase ventilation means.

FIG. 5 shows an internal combustion engine 1 comprising an intake path 2, a crankcase 3, an exhaust gas path 4 and a closed crankcase ventilation means 52. Here, the closed crankcase ventilation means 52 comprises a compressor 8 and also a first line 6 and a second line 7. The first line 6 is designed to connect the compressor 8 to the crankcase 3 in order to guide fresh gas from the compressor 8 to the crankcase 3. The second line 7 is designed to connect the crankcase 3 to the intake path 2 in order to discharge fresh gas and leakage gases located in the crankcase 3 from the crankcase 3 and to feed them to the intake path 2.

This exemplary embodiment is particularly advantageous if a compressed-air supply is already present with the compressor 8, for example in a vehicle. In this case, the charged fresh air can be used to flush the crankcase 3. Here, the first line 6 additionally comprises a water separator 10 and also an oxygen separator 11 in order to reduce moisture and the oxygen content. In this case, the separated-off oxygen is fed to the intake path 2, as shown in FIG. 5.

Figure 6:
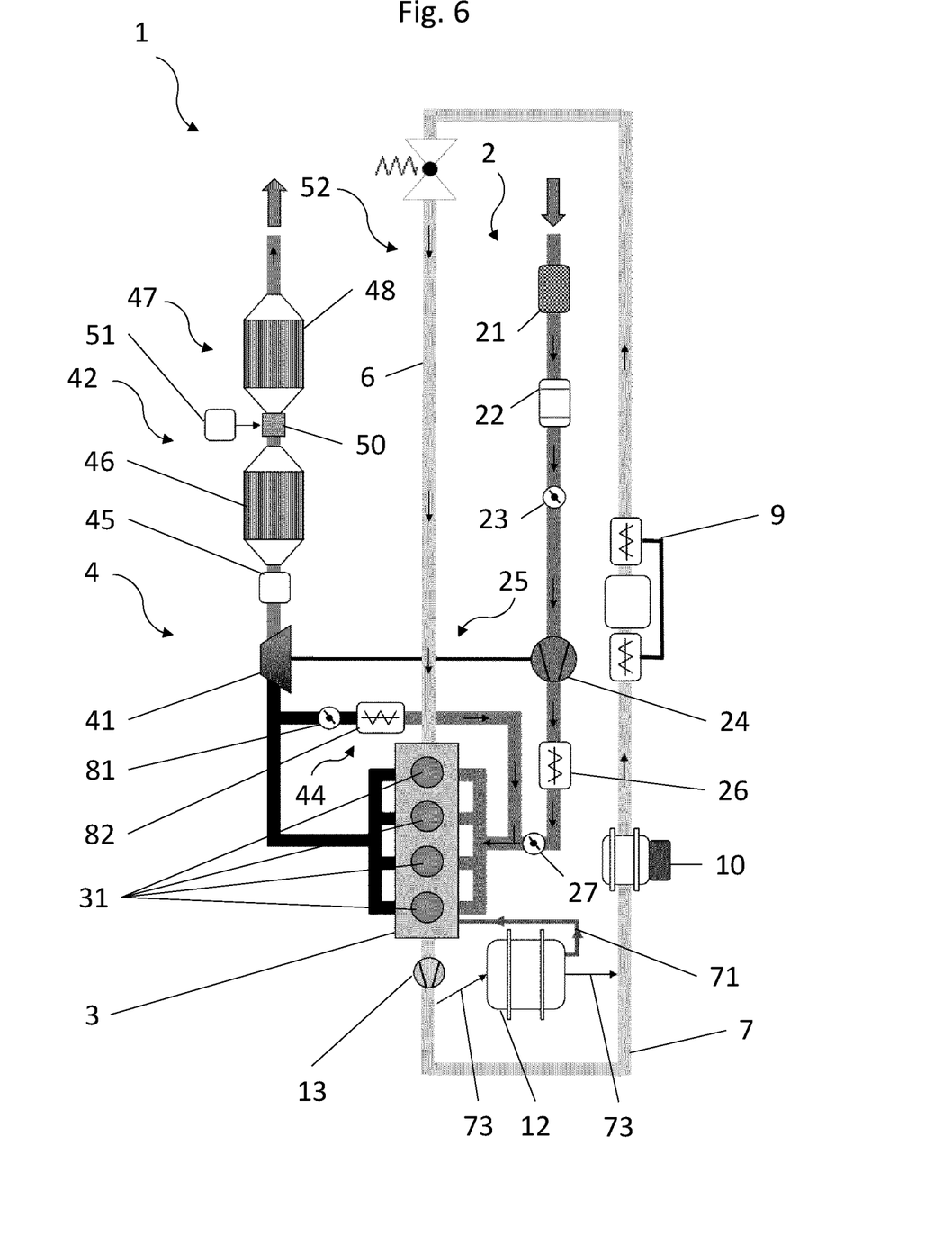
FIG. 6 shows an exemplary embodiment of an internal combustion engine with a separate crankcase ventilation means.

FIG. 6 shows an internal combustion engine 1 comprising an intake path 2, a crankcase 3, an exhaust gas path 4 and a separate crankcase ventilation means 53. The separate crankcase ventilation means 53 comprises a device for removing fuel 9 designed as an electrical catalytic converter (E-Cat) and also a first line 6 and a second line 7.

The first line 6 and the second line 7 are designed to conduct a substantially inert gas, here nitrogen. In this case, the first line 6 is designed to connect the E-Cat 9 to the crankcase 3 in order to guide the substantially inert gas from the E-Cat 9 to the crankcase 3. The second line 7 is designed to connect the crankcase 3 to the E-Cat 9 in order to discharge the substantially inert gas and leakage gases located in the crankcase 3 from the crankcase 3 and to feed them to the E-Cat 9.

The first line 6 and the second line 7 are substantially filled with nitrogen, so that the crankcase 3 is flushed with a substantially inert gas. Here, substantially means that the nitrogen can be diluted to a slight extent by flushed-out fluids from the crankcase 3 or other disturbance effects, such as leaks.

The separate crankcase ventilation means 53 comprises the E-Cat 9 in order to exothermically convert fuel flushed out of the crankcase 3, here hydrogen, and/or unburnt hydrocarbons, so that a proportion of combustible gas in the substantially inert gas is reduced. The thermal energy released is used here in order to heat up the substantially inert gas upstream of the E-Cat 9.

The second line 7 furthermore comprises a pump 13 in order to circulate the substantially inert gas, a water separator 10 and also a bypass line 73 in which an oil separator 12 is arranged. In this case, the bypass line 73 is controllable, so that the oil separator 12 is used only when there is a specific oil content in the substantially inert gas.

Figure 7:
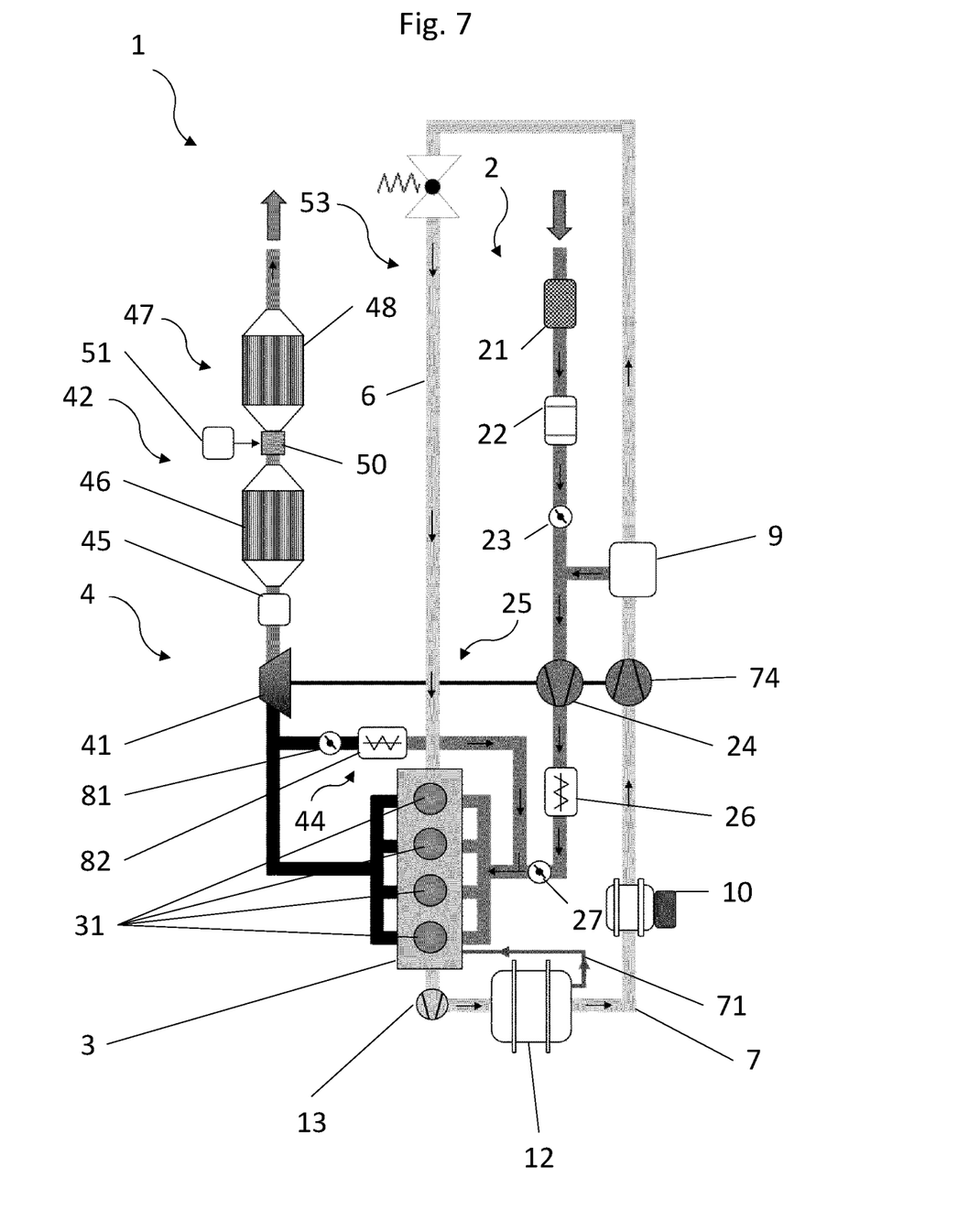
FIG. 7 shows an alternative exemplary embodiment of an internal combustion engine with a separate crankcase ventilation means.

FIG. 7 shows an alternative exemplary embodiment of an internal combustion engine 1 with a separate crankcase ventilation means 53. Here, the device for removing fuel 9 is configured as a hydrogen separator. In this case, the hydrogen separator 9 is configured such that separated-off hydrogen is fed to the intake path 2 upstream of the compressor 24 and is thus available in the combustion process.

Furthermore, the oil separator 12 is arranged in the second line 7 here and the line 7 has an additional compressor 74 which is mechanically connected to the exhaust gas turbocharger 25 in order to achieve better circulation of the substantially inert gas.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. An internal combustion engine, comprising:
   an intake path;
   a crankcase;
   an exhaust gas path; and
   a crankcase ventilation means comprising a first line directly connected to the crankcase for guiding a partial flow of a first gas out of a component directly to the crankcase and a second line connected to the crankcase for discharging the partial flow of the first gas and leakage gases located in the crankcase from the crankcase and to feed them to the component.

2. The internal combustion engine as claimed in claim 1, wherein the component is a device for removing fuel and the first line and the second line are designed to conduct a substantially inert gas, wherein the first line is designed to connect the device for removing fuel to the crankcase in order to guide the substantially inert gas from the device for removing fuel to the crankcase, and wherein the second line is designed to connect the crankcase to the device for removing fuel in order to discharge the substantially inert gas and the leakage gases located in the crankcase from the crankcase and to feed them to the device for removing fuel.

3. The internal combustion engine as claimed in claim 2, wherein the device for removing fuel is configured as a fuel separator or catalytic converter.

4. The internal combustion engine as claimed in claim 2, wherein the first line comprises a water separator and/or an oxygen separator.

5. The internal combustion engine as claimed in claim 2, wherein the second line comprises an oil separator.

6. The internal combustion engine as claimed in claim 2, wherein the second line comprises a pump or a fan.

7. The internal combustion engine as claimed in claim 2, wherein the internal combustion engine is designed to be operated using a gaseous fuel.

8. The internal combustion engine as claimed in claim 1, wherein the first line comprises a water separator and/or an oxygen separator.

9. The internal combustion engine as claimed in claim 1, wherein the second line comprises an oil separator.

10. The internal combustion engine as claimed in claim 1, wherein the second line comprises a pump or a fan.

11. The internal combustion engine as claimed in claim 1, wherein the internal combustion engine is designed to be operated using a gaseous fuel.

* * * * *